United States Patent [19]

Cordova et al.

[11] Patent Number: 4,842,934

[45] Date of Patent: Jun. 27, 1989

[54] FIBER FOR REINFORCING PLASTIC COMPOSITES AND REINFORCED PLASTIC COMPOSITES THEREFROM

[75] Inventors: David S. Cordova; David R. Coffin, both of Richmond; Stanley D. Lazarus, Petersburg, all of Va.; Hugh H. Rowan, Chapel Hill, N.C.; Robert M. Marshall, Chester, Va.

[73] Assignee: Allied-Signal Inc., Morris Township, Morris County, N.J.

[21] Appl. No.: 114,916

[22] Filed: Oct. 30, 1987

Related U.S. Application Data

[62] Division of Ser. No. 624,897, Jun. 27, 1984, Pat. No. 4,748,197.

[51] Int. Cl.$^4$ .................. C08L 77/00; D01F 6/62; D06M 13/00; D06M 13/50
[52] U.S. Cl. .................................. 428/378; 427/386; 427/387; 428/364; 428/375; 428/391; 428/395; 428/902; 524/114; 524/261; 524/262; 524/264; 524/265

[58] Field of Search .............. 428/364, 375, 378, 391, 428/395, 902; 427/387, 386; 524/114, 261, 262, 264, 265

[56] References Cited

U.S. PATENT DOCUMENTS

| 4,101,525 | 7/1978 | Davis et al. ................ 528/309 |
| 4,158,714 | 6/1979 | Brichta et al. .............. 428/391 |
| 4,695,509 | 9/1987 | Cordova et al. ............ 428/267 |

FOREIGN PATENT DOCUMENTS 0024423  3/1978  Japan .

Primary Examiner—George F. Lesmes
Assistant Examiner—James B. Monroe

[57] ABSTRACT

A high tenacity fiber for reinforcing plastic composites, the fiber being selected from the group consisting of polyester, aliphatic polyamide, and combinations thereof. The fiber is treated with a composition consisting essentially of an organofunctional silane in an amount sufficient to achieve 0.02 to 1.0 weight percent of the silane on the fiber, and a diluent which provides for the hydrolysis of the silane to a silanol. The fiber is used to reinforce a plastic composite additionally comprising a resin matrix.

8 Claims, 8 Drawing Sheets

FIGURE 5a - PULLED-OUT FIBER

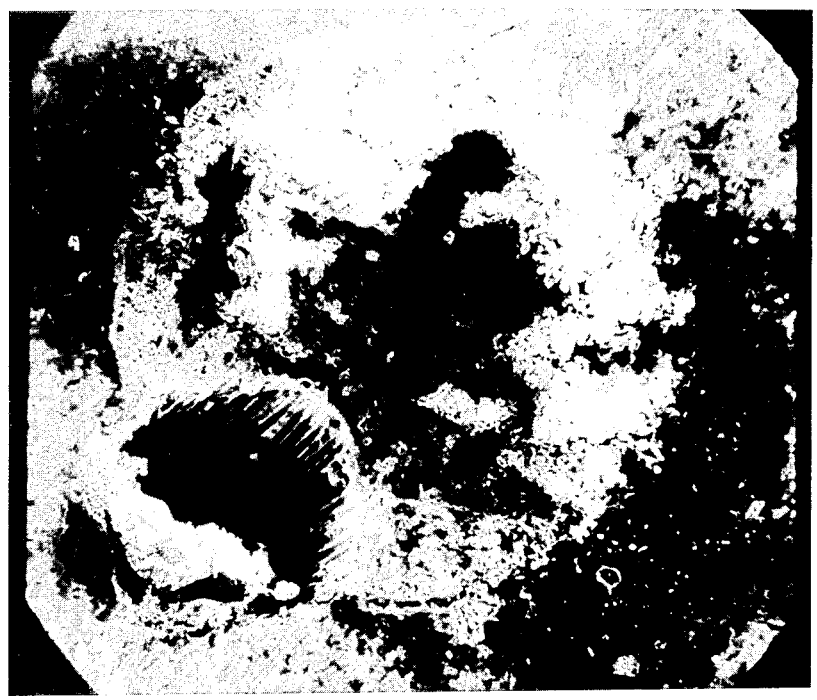
FIGURE 5b - BUTTON SAMPLE

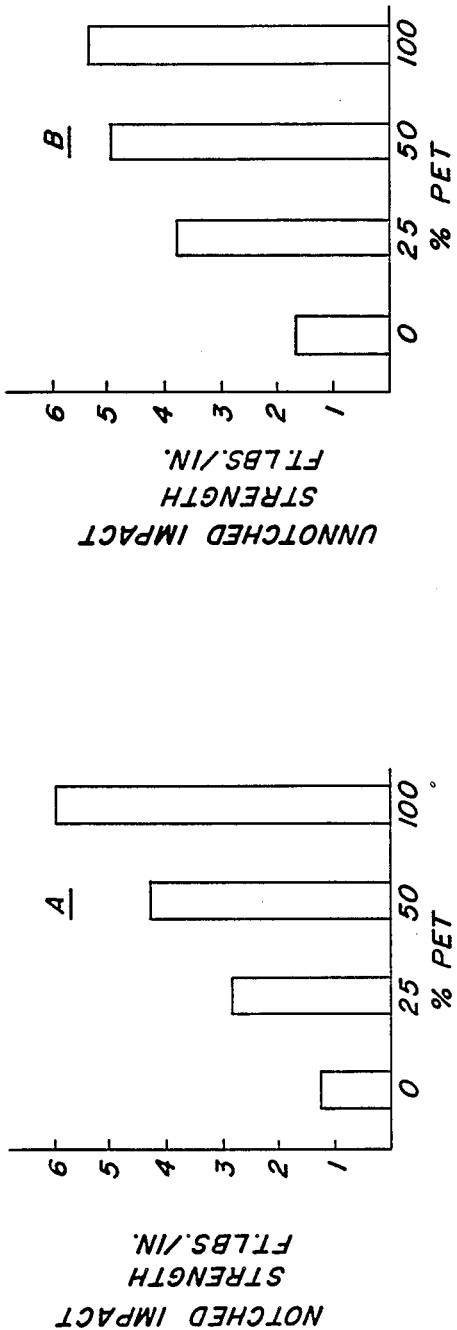
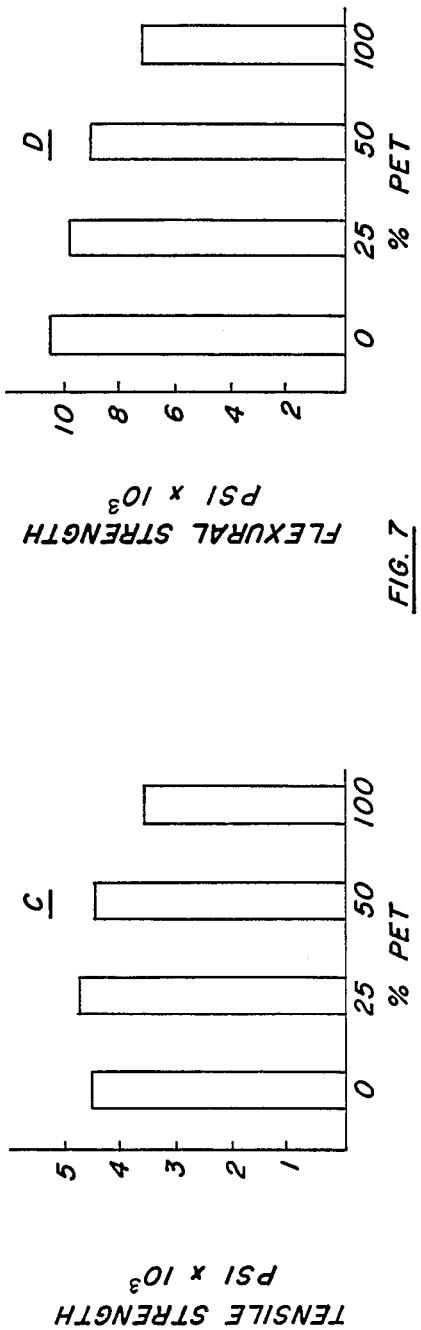
FIG. 7

FIBER FOR REINFORCING PLASTIC COMPOSITES AND REINFORCED PLASTIC COMPOSITES THEREFROM

This application is a division of application Ser. No. 624,897, filed 6/27/84, now U.S. Pat. No. 4,748,197.

BACKGROUND OF THE INVENTION

1. Field of the Invention

The present invention relates to a high tenacity fiber for reinforcing plastic composites and to the composites themselves wherein the reinforcing fiber, selected from the group consisting of polyester, aliphatic polyamide and combinations thereof, has been treated with a composition consisting essentially of an organo-functional silane in an amount sufficient to achieve 0.02 to 1.0 weight percent of the silane on the fiber and a diluent which provides for the hydrolysis of the silane to a silanol. More particularly, the present invention relates to a high tenacity, high elongation, low shrinkage polyester fiber which has been treated with a composition consisting essentially of water and gamma-glycidoxypropyltrimethoxysilane in an amount sufficient to achieve 0.02 to 1.0 weight percent of the silane on the fiber, especially for use in reinforcing a composite wherein the resin matrix comprises unsaturated polyester resin or other thermosetting or thermoplastic resins. The reinforcements can be used in bulk and sheet molding compounds, filament winding, pultrusion, spray-up and hand-layup.

2. The Prior Art

A composite consists of basically three major elements: the resin matrix, the reinforcement dispersed in the matrix, and the reinforcement-resin matrix interface. Synthetic fibers in staple or filamentary form, and fabrics produced therefrom, are known for polymer reinforcement. Typical of the fibrous reinforcements are glass, polyester, polyamide (nylon and aramid) and polyolefin fibers. Conventional matrix resins include thermoplastics, such as nylon and polyolefins, and thermosetting materials, such as epoxy and unsaturated polyester resins. Since the primary function of the fiber matrix interface is to transmit stress from the matrix to the reinforcing fibers, the chemical and physical features of the interface are critical to the mechanical properties and end use performance of the composite. The compatability between the reinforcing fiber and matrix is then a determining factor in the load sharing ability of the composite. Fiber coatings/binders have been used to enhance the compatability of the reinforcing fibers and resins with which they are to be used. See, for example, U.S. Pat. No. 3,637,417 to Green, hereby incorporated by reference. It is known to utilize silane coupling agents to bond dissimilar materials such as organic polymer and fibrous glass in the field of reinforced plastics. See, e.g., Green, supra, U.S. Pat. No. 4,158,714 to Brichta et al., and U.S. Pat. No. 3,658,748 to Andersen et al., and Marsden and Sterman, HANDBOOK OF ADHESIVES, Second Edition, 40, 640 (1977), all of which are hereby incorporated by reference. It is also known to utilize silane coupling agents to improve fiber to rubber adhesion, as taught by Japanese Kokai Publication J53-024423, hereby incorporated by reference, wherein a polyethylene terephthalate yarn is combined with from 0.7 to 1.2 weight percent on the yarn of a liquid composition consisting essentially of 10 to 30 weight percent of a silane having the structural formula

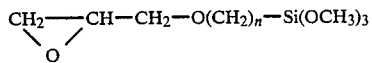

wherein n is 2 to 5, up to one weight percent of a nonionic wetting agent and 70 to 90 weight percent water. The present invention, however, is directed towards reinforcement of plastic composites and not elastomeric structures.

It is also conventional to substitute organic synthetic fibers in whole or in part for glass fibers in reinforced plastics. Some advantages are pointed out in U.S. Pat. No. 3,639,424 to Gray et al., hereby incorporated by reference, wherein heatset polyester staple is used to reinforce thermoplastic/thermosetting polymers for improved impact strength. Heatsetting the fiber allegedly permits uniform fiber dispersion in molded products.

The use of chemically modified polyester fabric as an auxiliary reinforcing agent with glass fibers for thermosets, including polyester, vinyl ester and epoxy, for improved impact resistance and flexural strength over straight glass reinforcement is disclosed in Plastics World Magazine, November, 1980, Volume 38, No. 11, page 102, hereby incorporated by reference.

Japanese Kokai Publication 54-55077 discloses a method for adhesion of polyester fiber/fabric and unsaturated polyester resins through application of a latex, which preferably includes a small quantity of bisphenol epoxy resin, to the polyester fiber/fabric.

The present invention is directed towards improving compatability between a resin matrix and the reinforcing fibers to thereby enhance the reinforced composite properties.

SUMMARY OF THE INVENTION

The present invention provides a high tenacity reinforcing fiber selected from the group consisting of polyester, aliphatic polyamide and combinations thereof, for reinforcing composites. The fiber may be staple or continuous filament per se or a knitted, woven or nonwoven fabric or mats. The reinforcing fiber is treated with a composition consisting essentially of an organofunctional silane in an amount sufficient to achieve 0.02 to 1.0, preferably 0.1 to 0.5, weight percent of the silane on the fiber, and a diluent which provides for the hydrolysis of the silane to a silanol. Wettability of the fiber and adhesion of the fiber to a resin matrix are thereby enhanced, and the compatibility of such reinforcing fiber to the resin is improved so that composites with reinforcement uniformly dispersed therein can be fabricated.

It is preferred that the treating composition consist essentially of 1 to 50, preferably 3 to 25, weight percent of the silane; up to 1 weight percent of a wetting agent; and 49 to 99, preferably 74 to 97, weight percent of the diluent.

The preferred diluent is water although it is believed that aqueous systems containing other highly polar materials such as low molecular weight alcohols would be satisfactory. The preferred wetting agent is nonionic, e.g., polyoxyalkylene nonylphenols, octylphenoxyethanols, although anionic wetting agents such as the dialkylsufosuccinates, particularly dinonyl and dioctyl), and 2-ethylhexylphosphate are suitable.

Organofunctional silane coupling agents may be found in chapter 40 of the HANDBOOK OF ADHESIVES, supra. The organofunctional silane utilized in the present invention is preferably selected from the group consisting of: Vinyl-tris(beta-methoxyethoxy) silane, gammaMethacryloxyalkyltrialkoxysilane, beta(3,4-Epoxycyclohexyl)alkyltrialkoxysilane, gamma-Mercaptoalkyltrialkoxysilane, gamma-Aminoalkyltrialkoxysilane, N-beta(aminoethyl)-gamma-aminoalkyltrialkoxysilane, and

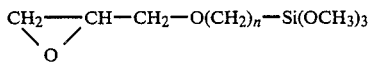

wherein n is 2 to 5, and combinations thereof. The most preferred silane is gamma-glycidoxypropyltrimethoxy silane.

The preferred reinforcing polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, 2,8-dibenzofurandicarboxylic acid, or 2,6-naphthalene dicarboxylic acid. The glycols may contain more than two carbon atoms in the chain, e.g., diethylene glycol, butylene glycol, decamethylene glycol, and bis-(1,4-hydroxymethyl)cyclohexane. Examples of linear terephthalate polyesters which may be employed include poly(ethylene terephthalate), poly(ethylene terephthalate/5-chloroisophthalate)(85/15), poly(ethylene terephthalate/5-[sodium sulfo]-isophthalate) (97/3), poly(cyclohexane1,4-dimethylene terephthalate), and poly(cyclohexane-1,4-dimethylene terephthalate/hexahydroterephthalate) (75/25).

Suitable reinforcing polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodacanedioic acid, or by polymerization of 6-caprolactam, 7-aminoheptanoic acid, 8-caprylactam, 9-aminopelargonic acid, 11-aminoundecanoic acid, and 12-dodecalactam, known as nylon 6, nylon 7, nylon 8, nylon 9, nylon 11, and nylon 12, respectively.

The most preferred reinforcing fiber is a polyethylene terephthalate, characterized by a thermal shrinkage of up to about 11 percent, preferably 3 percent or less; an elongation of from about 10 to 28, preferably 14 to 24 percent; a modulus after cure of at least about 60, preferably 70 to 90 grams per denier; and a tenacity of at least 5.5, preferably 7 to 9 grams per denier. By modulus after cure is meant the modulus of the fiber after exposure in an unconstrained state to curing temperatures for the composite.

The present invention also relates to a fiber reinforced plastic composite comprising a resin matrix and the described reinforcing fiber.

The resin matrix may include thermosetting or thermoplastic (including polyolefin) resins. Suitable thermosetting resins include polyester (preferably unsaturated), epoxy, or vinyl ester resin systems. Suitable thermoplastic resin systems include polyvinyl chloride, polyethylene, polypropylene, polystyrene, polyvinyl alcohol, polyamide, polyurethane, etc.—any thermoplastic having a lower melting point than that of the fiber, e.g., less than 230° C. for reinforcement with polyester fibers and less than 200° C. for reinforcement with nylon fibers.

The resin matrix also may include enhancers, mold release agents and fillers, as are known in the composite art, in addition to the treated fibers and resins.

It is also preferred that there be other reinforcing fibers, more preferably glass fibers, as will be more fully discussed below.

BRIEF DESCRIPTION OF THE DRAWINGS

FIGS. 5a–b are photographs of an adhesion test sample;

FIGS. 7A–D are bar graphs of BMC injection molded composite properties.

DESCRIPTION OF THE PREFERRED EMBODIMENT

Preliminary research was directed towards engineering a polyethylene terephthalate (hereafter PET) fiber specifically for reinforcement of rigid composites. Research first addressed the question of what type of PET fiber is most suitable as a reinforcing fiber in composites. There are many grades of PET commercially available. However, preliminary screening showed only very specific types to be even potentially useful in composites.

With reference to Table I, it can be seen that textile grade PET fiber (Burnet Southern, Inc.) is unsuitable for reinforcement, primarily because of its low tenacity, low modulus, and large thermal shrinkage, resulting in a composite with poor notched impact strength.

It was expected that high tenacity industrial PET fibers could provide superior impact strength with adequate tensile strength. Preliminary work showed this to be true; however, a wide range of values was obtained based on differing fiber types. It has been found that tensile properties of the fiber as normally measured, as well as after exposure to the thermal molding conditions encountered in fabricating a reinforced composite article, are important. The latter is more important since the final properties of the fiber in the composite more directly affect composite performance.

EXAMPLE 1

Data for three types of high strength industrial PET fibers, commercially available from Allied Corporation, are shown in Table 1. These are: Type A—a high tenacity, low elongation fiber normally used for tire reinforcement; Type B—a high tenacity, high elongation, low shrinkage fiber normally used for hose reinforcement; and Type C—a high tenacity, high elongation, ultralow shrinkage fiber normally used for coated fabrics. Molded composite specimens were prepared from each of the fibers using a 12 weight percent PET fiber loading, equivalent in volume to 20 weight percent glass. The type B fiber appeared to give the best balance of composite properties. This is unexpected based on initial fiber properties.

The fibers were subjected to simulated curing temperatures of from 95°–150° C. while in an unconstrained state. Fiber physical properties were measured both before (control) and after heat treatment. The effects of thermal exposure on Fibers A, B and C, respectively are presented in Tables 2–4.

Figure 1:
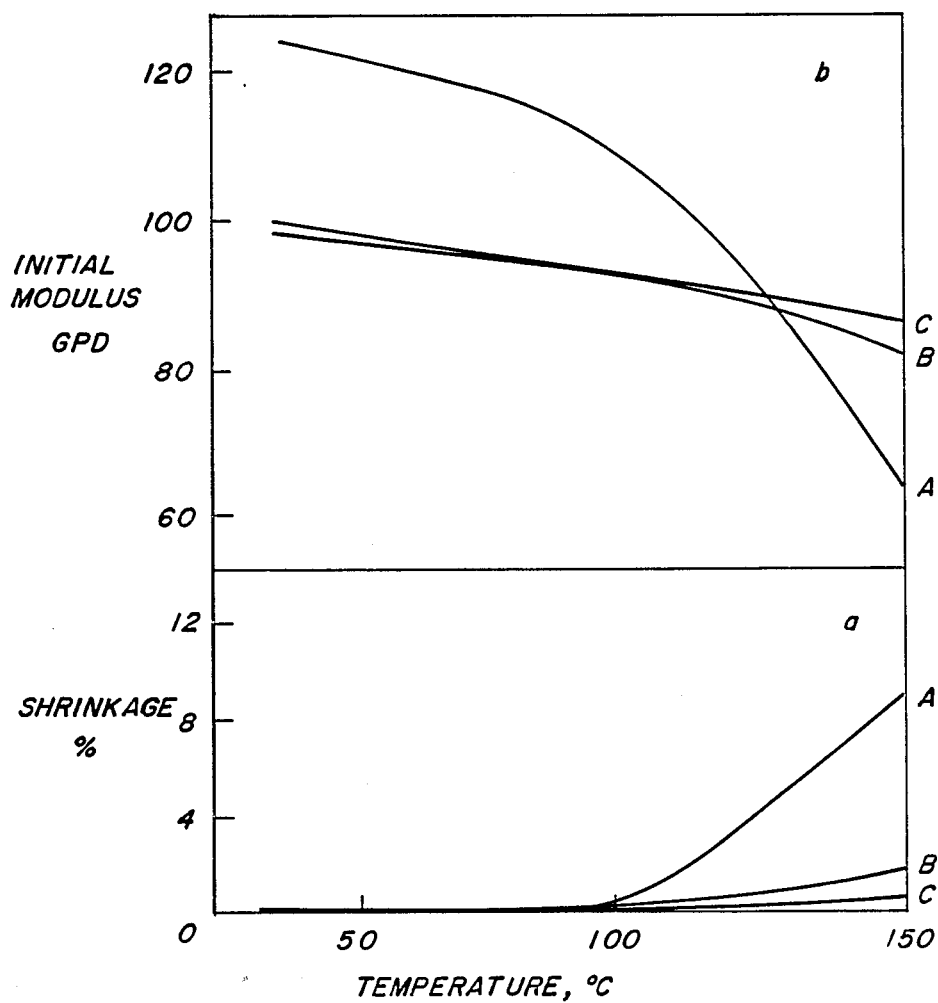
FIG. 1 is a graph depicting the effect of thermal exposure on (a) shrinkage and (b) fiber modulus.

As shown in FIG. 1-a, Type A underwent a large amount of shrinkage at temperatures as low as 120° C. In contrast, the two low shrinkage fibers B and C showed very little shrinkage during thermal exposure, as expected. Since excessive shrinkage during processing would have a detrimental effect on fiber/resin bonding, this might be expected to result in reduced composite properties.

The thermal exposure also had greatly differing effects on the moduli of the different fibers tested (reference FIG. 1-b). When tested at room temperature, the high tenacity Type A fiber had a 20–25 percent higher initial modulus and 10 percent higher tenacity than the low shrink fibers. However, after exposure to the elevated temperatures, the Type A fiber showed a more dramatic change than either of the others. Also, and not to be expected from normal measured physical properties, the final modulus of Type A was nearly 30 percent lower than the final modulus of the two low shrink fibers after exposure to 150° C. Therefore, in their effect on composite properties, the two low shrinkage fibers appear to be superior in spite of the fact that tensile properties on virgin yarn appear to be superior for the Type A fiber.

Figure 2:
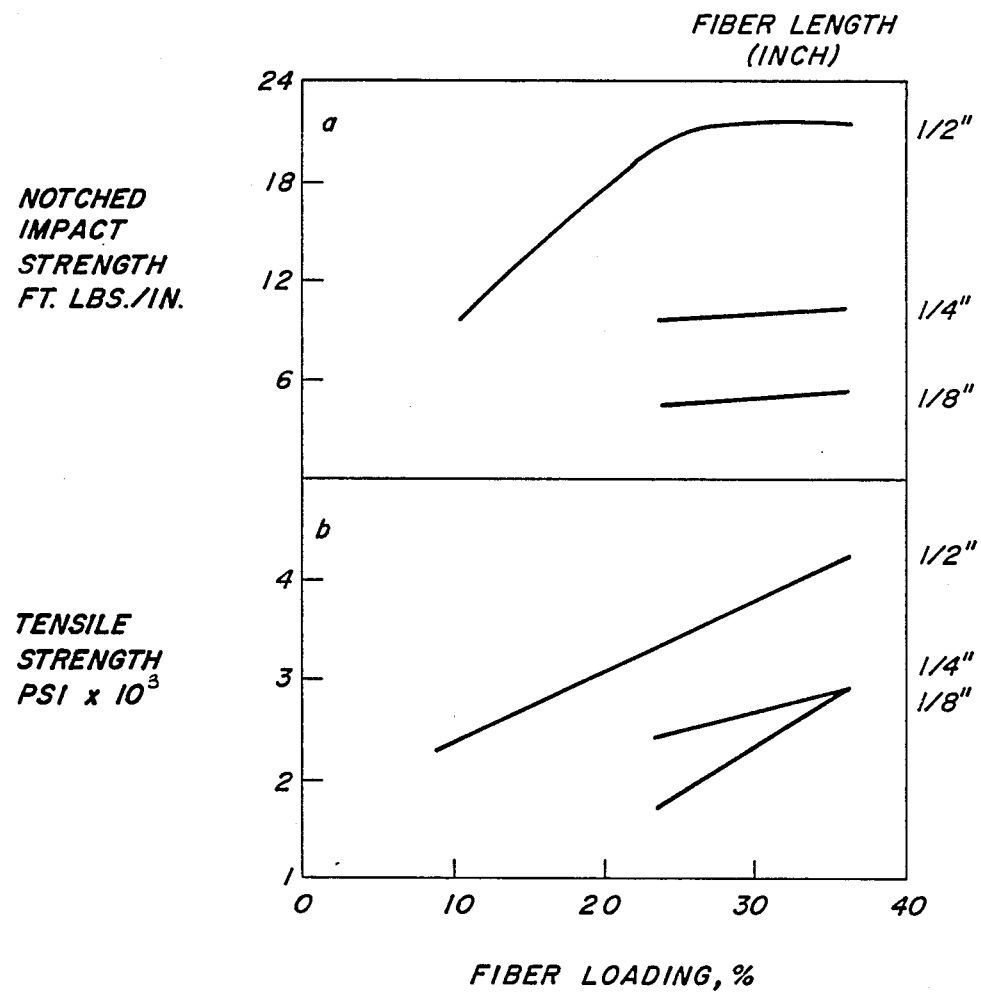
FIG. 2 is a graph depicting the effect of fiber length and loading on composite properties.

The ultralow shrink Type C fibers tested had a lower molecular weight, which results in a lower tensile strength fiber than the Type B low shrink fiber. It was found that the initial tenacity was essentially unchanged by thermal treatment for any of the fibers. Therefore, the slightly better dimensional stability of the Type C ultra low shrink fiber is more than offset by the higher tenacity Type B low shrink fiber.

fiber length at several levels of total fiber loading. Results are plotted in FIGS. 2a and b. For each doubling of fiber length the impact strength also doubled. Subsequent testing showed that a ¾ inch (1.9 cm) PET fiber reinforced composite resulted in still more improved impact strength. There was little difference in composite tensile strength between ⅛ and ¼ inch (0.32 and 0.64 cm) fiber. However, using ½ inch (1.3 cm) fiber resulted in an increase in tensile strength of about 50 percent. These results point out a significant advantage of an organic filament reinforcement. In contrast to glass, which can shatter into shorter lengths during compounding, PET fiber does not break into shorter lengths. This allows PET fiber to retain its maximum advantage for impact strength.

EXAMPLE 2

It is known that the fiber coating is a factor in stress distribution for the composite. In preliminary studies it was observed by scanning electron microscope that a very nonuniform wetout and poor adhesion were achieved between PET fibers and thermoset polyester resins. To improve these features for thermoset polyester resins various types of fiber coatings were used. The properties of these coatings were varied in order to determine the degree of influence of the boundary on the composite performance.

The binders applied are listed in Table 5. The yarn utilized was Type B of Table 1. Yarn was removed from a supply package at 1000 ft/min (305 m/min) and passed over a stainless steel lube roll that was partially immersed in the binder/finish composition, after which the yarn was passed through drive rolls and thence to a winder where it was wound. The yarn was removed from the supply package through eyelet guides and two tension gates to flatten the yarn bundle for passage over the roll and to prevent bouncing. The yarn touched the roll as a tangent, a minimum contact angle being maintained. The lube roll was 4 inches (10 cm) in diameter and turning at an RPM sufficient to achieve the percent solids on yarn indicated in Table 5. For the composition of the present invention, the roll was turning at 15 RPM.

Several methods to determine the adhesive properties of the PET fiber were evaluated. For comparison and

TABLE 1

| | Fiber and Composite Properties[1] | | | | | | |
|---|---|---|---|---|---|---|---|
| | Fiber Properties | | | | Composite[1] Properties | | |
| Fiber | Tenacity[4] gpd | Modulus[5] gpd | Elongation, %[6] | Thermal Shrinkage, %[7] | Notched Impact ft lb/in[8] | Tensile Strength psi[9] | Flexural psi[10] |
| E-Glass | 6.5 | 320 | 2.1 | 0 | 4.4 | 5000 | 15 200 |
| Textile Fiber[2] | 4.5 | 30–40 | 30 | 5–8 | 2.9 | 2900 | 2500 |
| Type A[3] | 8.9 | 123 | 14 | 9.1 | 8.4 | 2500 | 4100 |
| Type B[3] | 8.1 | 98 | 22 | 1.8 | 9.7 | 2900 | 4300 |
| Type C[3] | 7.6 | 99 | 21 | 0.6 | 9.4 | 2700 | 4400 |

[1]Polyester BMC formulation 20 weight percent glass, glass replaced by PET on equal volume basis Fiber length = 0.25 inch (0.64 cm) Balance 18.33% isophthalic polyester resin (MR 14017 USS Chemicals), 5.86% resinous modifier (MR 63004 USS Chemicals), 0.31% tert-butyl(perbenzoate), 0.12% promoter, 0.01% inhibitor solution (butylated hydroxy toluene and styrene), 1.30% zinc stearate, 52.57% aluminum trihydrate, 1.50% pigment (CM7106 Red by Plastic Colors).
[2]Commercially available from Burnet Southern.
[3]Commercially available from Allied Corporation.
[4]ASTM D-885.
[5]ASTM D-885.
[6]ASTM D-885.
[7]ASTM D-885.
[8]ASTM D-256
[9]ASTM D-638
[10]ASTM D-790

The optimum PET fiber length for staple reinforcement appears to be the longest length which will still allow practical handling and dispersion. Notched impact strength showed a significant response to fiber length. Three fiber lengths, ⅛, ¼ and ½ inch (0.32, 0.64 and 1.3 cm) were used to determine the affect of PET evaluation purposes, the adhesive properties were measured as a function of the interfacial shear strength. The interfacial shear strength was calculated from the pullout load, P using the following equation $$\tau = \frac{P}{D\pi L}$$

where
 $\tau$=interfacial shear strength,
 D=fiber diameter, and
 L=embedded fiber length in the matrix.

Figure 3:
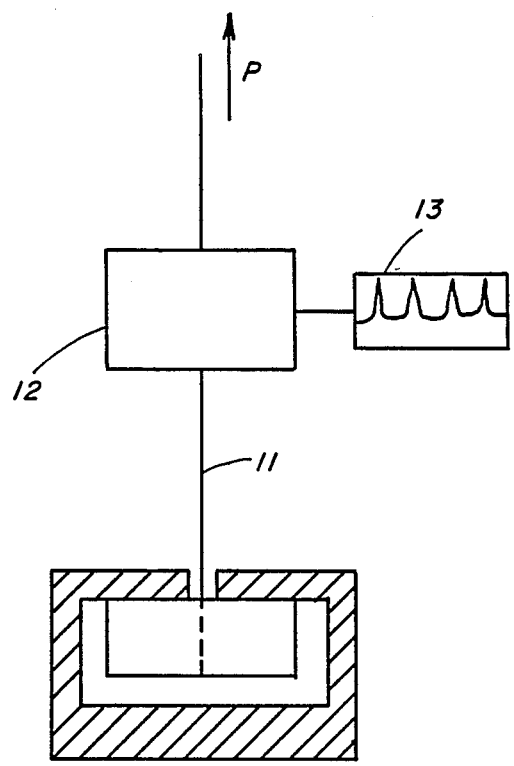
FIG. 3 schematically shows the equipment utilized to evaluate interfacial shear strength.
Figure 4:
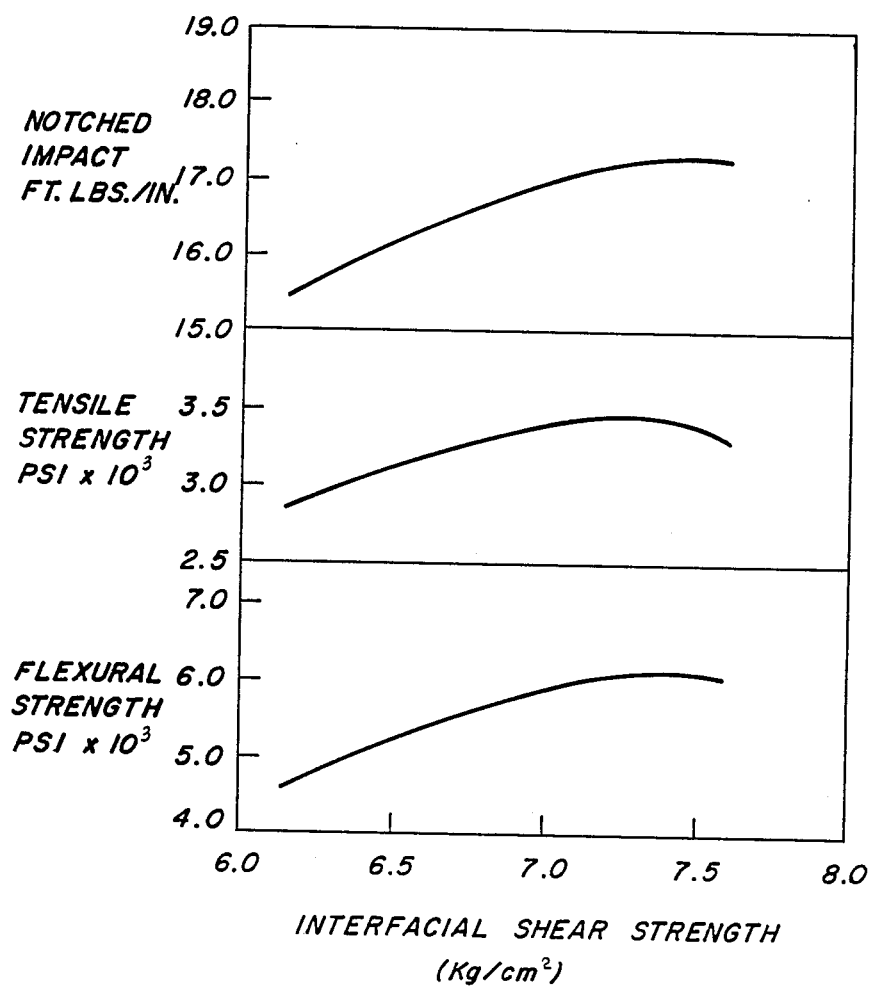
FIG. 4 is a graph depicting the effect of interfacial shear strength on composite properties.

A small portion of an overfinished PET fiber was embedded to a depth of 0.25 inch (0.64 cm) in a compounded thermoset polyester resin of the formulation set forth in Table 1. FIG. 3 depicts the setup for the operation utilized to evaluate the interfacial shear strength. The fiber 11 was subjected to a tensile force (pullout force) with an Instron 12 in the axial direction of the filaments, causing shear debonding stress on the interface. The Instron 12 has a recorder 13 attached thereto to record the pullout load, P, in pounds (kg). By using this technique, the effect of use of different binders on the interfacial strength of the composite could be determined. This test is called the button mold pullout test. The interfacial shear strength is the total overall strength of the interface due to physical, mechanical and chemical bonding. The composite physical properties were determined for the different interfacial shear strength values delivered by the different binders, and the effect is depicted in FIG. 4. As expected, up to a level of about 7.3 kg/cm³, composite properties improved proportional to $\tau$; however, at just over 7.3 kg/cm³ the data seem to show that maximum composite properties were achieved and further increases in interfacial shear strength were detrimental. In fact, what was observed is that the type of materials which achieve a high concentration of crosslinking sites and therefore a very high interfacial shear strength showed a poor wetout by the resin. This poor resin wetout created a number of voids and flaws which acted as stress concentrators within the matrix leading to early failure. Thus, fiber/matrix wettability is also a key to better load sharing and transferring between phases.

The wettability of the treated fibers listed in Table 5 by the specified resin was determined as follows. A value of 1 to 10 was assigned to a particular fiber wherein 1=poor and 10=excellent based on visual inspection and two tests. The visual examination occurred during BMC compounding of ½ inch (1.3 cm) length PET filament (1000 denier, 192 filaments) at 20 percent loading (i.e., volume equivalent 20 weight percent fiberglass) with the resin matrix set forth before. The resin matrix included 1.5 weight percent of a red pigment available as CM-7106 from Plastic Colors to aid the visual inspection. After compounding for 60 seconds, the compounded mass was manually pulled apart, fibers pulled out and felt for wetness and observed for color change. Compounding was restarted and continued for 30 seconds after which the same observations were made. This continued until maximum wetout of the fiber occurred. For fibers with binder systems 2 and 5 (Table 5) the visual inspection also included examination of the fiber bundle for spreadability and pickup of the resin during a filament winding process when the fiber bundles were run in parallel and with minimal tension under a roll in a resin bath; the resin was a polyester resin (50 parts Freeman 40-2092 and 52 parts Freeman 40-2490). Fiber with binder system 5 had a vastly greater pickup than fiber with binder system 2. One of the tests relied upon in forming the wettability value was using a scanning electron microscope (SEM) to evaluate broken composites. The fibers of Table 5 were used to compound a 20 percent load PET fiber reinforced BMC compound. These compounds were molded [320° F. (160° C.), 1.5 min, 1 ton press] into tensile, flexural and impact specimens, as well as plaques. The specimens were broken for testing in accordance with ASTM tests: the tensile specimen according to D-638, the flexural according to ASTM D-790 and the impact specimen according to ASTM D-256. The plaques were manually broken. The broken specimens and plaques were taken to an SEM laboratory for examination. The fibers jutting out from the fracture point were observed for residual matrix or matrix cling. If the fiber was clean, adhesion and wetout were ranked 1. The more matrix clinging to the fiber, the higher the ranking, up to a rating of 10. Button test specimens could be similarly evaluated. SEM photographs, the button sample and the pulled out fiber are shown in FIG. 5. FIG. 5-a shows the section of the fiber that was embedded where pieces of the matrix cling to the fiber. FIG. 5-b shows the orifice from which the fiber was pulled. SEM rankings are presented in Table 6. In another test the contact angle of a polyester molding resin (MR14017 from USS Chemicals) on a unidirectional fabric made with the coated yarns was measured. The unidirectional fabric was made by guiding the coated PET fiber bundles over a winding mechanism so that a fabric could be made from closely packed parallel fiber bundles. A sessile drop of the liquid molding resin was placed on the fabric held under tension (0.2 gram/fil), and the contact angle on the fabric was measured with time. The contact angles measured are presented in Table 6 as well as a ranking of the coated fibers with respect to wettability.

PET fiber inherently has low fiber bundle integrity (fiber bundle integrity is the degree to which the individual filaments adhere to each other). The main benefit of a low integrity fiber is that it allows the dispersion of single filaments over a large resin matrix area. This even distribution results in a homogeneous reinforced composite, a direct result of which is an improved cosmetic look.

The binder system of the present invention (number 5 of Table 5) was chosen as the low integrity system because of its good adhesion and exceptional resin wetout. This was despite the fact that fiber with binder system 2 resulted in a composite with equal or better physical properties. See Table 7. Note that the major difference between binder systems 2 and 5 is the additional oils in the noncontinuous phase for system 2, i.e., both systems include the same epoxy silane and water. However, these benefits could not offset the exceptional resin wetout of the fiber with binder system 5 during processing, as observed during filament winding operations. This increase in wettability was also seen in BMC processing in the form of improved mixing and surface appearance. In addition, the BMC composite physical properties for the fiber with binder system 5 were acceptable. The binder wettability characteristics were also measured via contact angle and again, fiber with binder system 5 showed a major edge over the balance of the system. Fiber with binder system 2, when used in forming a BMC plaque, evidenced white, dry spots of yarn in the plaque, which were aesthetically unacceptable. This is critical, given the market for such composites.

EXAMPLE 3

Several thermoset polyester resins were evaluated to determine the best for composite applications where 0.5 inch (1.3 cm) PET fiber coated with 0.2 weight percent solids of binder system 2 was used as reinforcing fiber, alone and in combination with glass. A sample with 100 percent glass reinforcement was also run. Total fiber loading was kept constant at the volume equivalent to 20 weight percent glass. The curing temperature used was 300° F. (149° C.). Typical composite physical properties were measured on the molded samples, and are shown in Table 8. Resin matrix formulation was as previously described, with the resins identified in Table 8.

Impact strength is a measure of a composite's resistance to a sudden sharp impact. Replacement of glass fiber by polyester fiber results in a great improvement in this property. Two types of impact tests were run, notched and unnotched. In the notched impact test, impact strength for 100 percent PET fiber reinforced composite increased from 15 to 20 foot pound/inch as the resin elongation was increased from 0.9 percent to 10 percent. For the 100 percent glass reinforced composite and composites reinforced by mixtures of PET fibers and fiberglass, impact strength remained relatively constant with increasing resin elongation. As the proportion of PET fiber was increased, the impact strength was seen to increase at all resin elongations. The increase was greater at the higher resin elongations. Results of the unnotched impact test showed the same general trends observed in the notched test. In this case, however, the composites were reinforced by 100 percent glass fibers, and PET/glass fiber mixtures tended to lose impact strength as resin elongation increased. Again, as the proportion of PET fiber and the reinforcing fiber increased, impact strength increased at all resin elongations with the increase being larger at higher elongations. These results demonstrate that higher elongation resins are preferable for increased impact strength for PET fiber reinforced composites.

While PET is stronger than glass on a strength per unit weight basis (9.0 gpd versus 6-8 gpd), the fact that a specific gravity is nearly 50 percent lower than glass means that an equivalent volume of PET fibers will be less strong than glass fibers. Thus, PET reinforcing fibers provide a molded part which is not as strong as that reinforced by 100 percent glass fibers.

On an equal volume loading basis, composite strength decreased roughly by a factor of 2 going from 100 percent glass fiber reinforced composite to a 100 percent PET fiber reinforced composite. The change in tensile strength with PET/glass fiber ratio showed a linear relationship in all resin systems, indicating that composite strength followed the rule of mixtures well.

Tensile strength did not change dramatically with resin elongation. In general, the maximum value occurred using the 6.1 percent elongation resin, with the tensile strength being 10 to 25 percent higher than for the high and low elongation resin. The PET/glass ratio of the reinforcing fiber used did not appreciably affect the location of this maximum. Therefore, the 6.1 percent elongation resin appears to be the resin of choice to maximize the tensile strength of PET reinforced composites.

Flexural strength is another measure of the strength of a composite material, having both tensile and compressive components. The same general trends were seen here that were noted for tensile strength. For 100 percent PET fiber and 100 percent glass fiber reinforced composites the maximum tensile strentgh was obtained using the 6.1 percent elongation resin. This was also the case for the sample reinforced by a 12.5/87.5 PET/glass fiber mixture. The samples reinforced by 25/75 and 50/50 PET/glass fiber mixtures showed a steady increase in flexural strength with increasing resin elongation. Flexural strength gains of 10 to 30 percent were obtained by using the 6 or 10 percent elongation resins relative to the 0.9 percent elongation resin typically used with 100 percent fiberglass reinforced composites. Therefore, the use of a medium to high elongation resin is preferable to maximize flexural strength.

With the exception of Barcol hardness, increasing the resin elongation over that typically used (0.9%) with glass fiber resulted in improved composite physical properties. Tensile and flexural strength had the maximum values using a resin with a 6.1 percent elongation to break. This medium elongation resin thus appeared to be the best for use with the PET fiber coated with a binder system.

EXAMPLE 4

As generally recognized, the mechanical properties of a reinforced composite are strongly dependent on the level of reinforcing fiber used. In general, the properties improve with total fiber loading up to a maximum loading where the mechanical properties level or fall off due to inadequate fiber dispersion or insufficient resin to form a good matrix.

In this example BMC formulations were made using 100 percent of PET fiber coated with binder system 2, 100 percent glass fiber, and mixtures of the PET fiber and glass fiber as the reinforcing agent. Fiber loadings were reported as the weight percent glass equivalent to the total fiber volume loading used. Total fiber loadings of 10 to 35 percent were used. Sample specimens were made and tested for tensile strength and impact strength. See Table 9.

Figure 6:
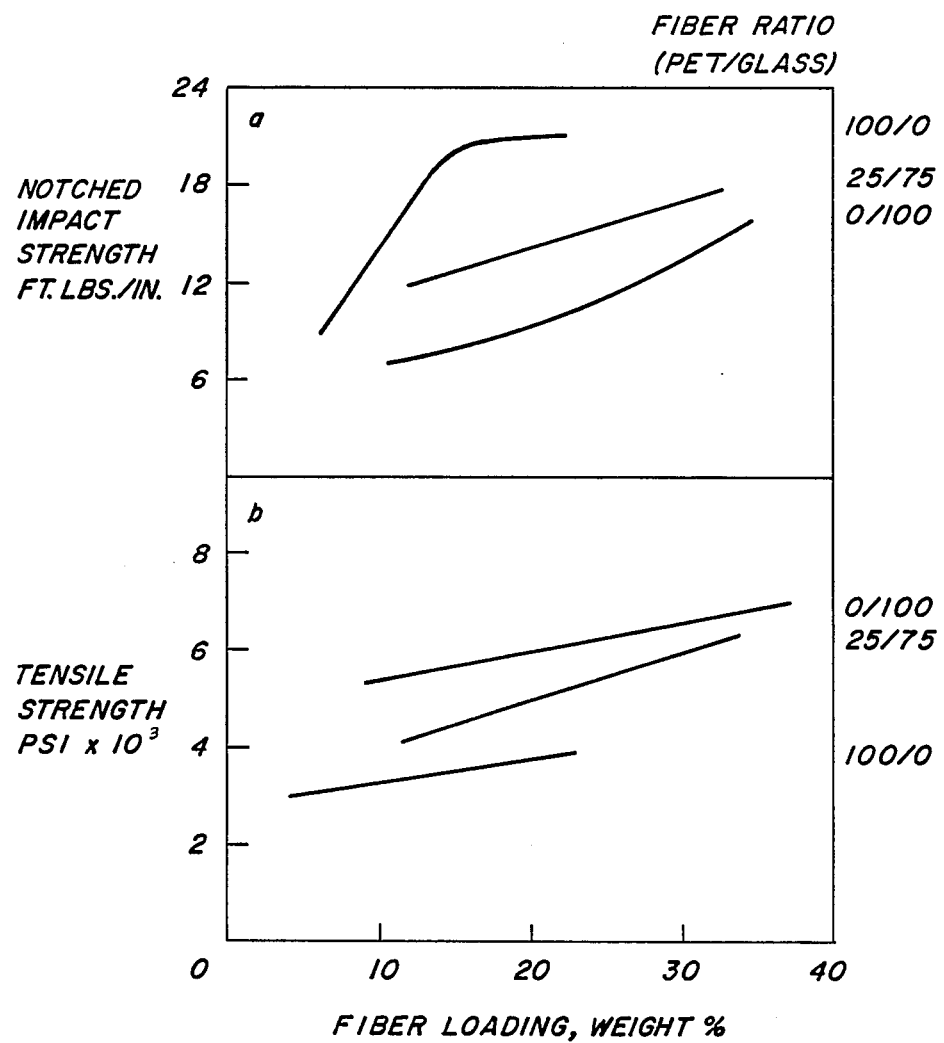
FIG. 6 is a graph depicting the effect of fiber loading on composite properties.

With each reinforcing system the impact strength increased with increasing fiber loading, as shown in FIG. 6. The best impact strengths were seen for the composites reinforced with 100 percent PET fiber, having values as high as 21 foot pound/inch. Impact strengths for the PET/glass fiber mixtures were in between the values for the 100 percent reinforced composites and the 100 percent glass fiber reinforced composites.

For this BMC formulation, total fiber loading equivalent to about 25 percent by weight fiberglass appeared to be optimum. Beyond this level, difficulties began to be encountered in compounding, while only small additional gains in impact strength were seen.

Tensile strengths also increased with increasing total fiber loading for each of the reinforcing systems studied and as shown in FIG. 6. PET fiber is as strong as glass fiber on a weight basis, but because of the higher density of glass, glass reinforced composites are stronger on an equal volume reinforcement basis. However, at the 20-25 percent loading level, the composites reinforced by PET/glass fiber mixtures were nearly as strong as the 100 percent glass reinforced composites.

EXAMPLE 5

In this example bulk molding compounds containing 20 weight percent glass loading, glass replaced by PET fiber on equal volume basis, were made and molded into specimens for testing. The BMC resin matrix was as previously described, and the PET fiber had been treated with binder system 2. The composition of the reinforcing fibers was varied, with relative polyester fiber/glass fiber volume ratios of 0/100, 25/75, 50/50, and 100/0 being used. All fiber loading levels reported are given as the weight percent glass equivalent to the particular volume of loading of the fiber used. The same composite properties were measured as reported previously and the results are given in Table 10. These data show that partial replacement of glass fiber by PET fiber in a reinforced composite results in significant gains in impact strength with very little sacrifice in tensile strength, especially at a fiber ratio of 25/75 PET/glass. This results in molded parts with overall properties which are superior to parts reinforced by either fiber used alone.

Studies were also run on BMC injection molded composites reinforced by all PET fiber, all glass fiber, and PET/glass fiber mixtures to determine the effect. The results are presented in Table 11 and shown graphically in FIGS. 7A-D.

The replacement of glass fibers by PET fibers resulted in greater increases in impact strength than were observed for compression molded samples. At the same time, tensile strength and flexural strength were less effective by replacement of glass with PET fibers than in compression molded samples. This is presumably due to the fact that shear and the injection molding machine broke the glass fibers into shorter lengths without affecting the lengths of the PET fibers. In addition, it may be possible that the presence of the PET fibers protect the glass fibers from damage to some extent.

EXAMPLE 6

Binder systems are formulated similar to that of system 5, but substituting the following organofunctional silanes for the silane of system 5:
Vinyl-tris(beta-methoxyethoxy)silane;
gamma-Methacryloxyalkyltrialkoxysilane;
beta(3,4-Epoxycyclohexyl)alkyltrialkoxysilane;
gamma-Mercaptoalkyltrialkoxysilane;
gamma-Aminoalkyltrialkoxysilane; and
N-beta(aminoethyl)-gamma-aminoalkyltrialkoxysilane.
These systems are used to overfinish type B (Table 1) PET fibers for reinforcement of plastic composites. Performance should be comparable to PET fiber treated with binder system 5.

EXAMPLES 7-8

PET fiber type B with binder system 5 at 0.20% solids pickup was cut into ¾ and 1 inch (1.9 and 2.5 cm) lengths in Examples 7 and 8, respectively, and used to compound a 20 percent load, 100 percent PET fiber reinforced BMC compression compound with the resin matrix formulation of Table 1 (6.1% elongation resin). Excellent composite properties were obtained.

EXAMPLE 9

Nylon 6 fiber having a nominal denier of 1260, 204 filaments, modulus of 44, breaking strength (lbs) 24.5, tenacity 8.8 gpd, breaking elongation (%) 20.5, commercially available from Allied Corporation, had binder system 5 applied via a kiss roll at a solids pickup of 0.20 percent. The fiber was cut into 0.5 inch (1.3 cm) lengths and used to compound a 20 percent load nylon reinforced BMC compression composite with the resin matrix formulation of Table 1. Composite properties are presented in Table 11.

TABLE 2

Effect of Thermal Exposure on Fiber A

| Exposure Temp. °C. | Time Min. | Thermal Shrinkage, percent | Tenacity, gpd | Elongation Percent | Modulus gpd |
|---|---|---|---|---|---|
| —* | — | 9.1 | 8.8 | 13.1 | 123.2 |
| 95 | 1 | 8.8 | 9.0 | 13.2 | 114.9 |
| 95 | 3 | 8.5 | 9.3 | 13.7 | 112.8 |
| 95 | 10 | 9.2 | 8.8 | 14.0 | 105.2 |
| 95 | 20 | 8.4 | 9.1 | 14.6 | 106.6 |
| 120 | 1 | 5.6 | 9.3 | 18.6 | 95.6 |
| 120 | 3 | 6.0 | 9.2 | 19.5 | 85.2 |
| 120 | 10 | 4.8 | 9.2 | 20.4 | 85.9 |
| 120 | 20 | 4.4 | 9.0 | 20.2 | 82.4 |
| 150 | 1 | 1.1 | 8.7 | 26.1 | 62.4 |
| 150 | 3 | 0.2 | 8.6 | 28.2 | 63.8 |
| 150 | 10 | 0.6 | 9.0 | 27.6 | 65.2 |
| 150 | 20 | 0.2 | 8.9 | 28.8 | 62.4 |

*Control

TABLE 3

Effect of Thermal Exposure on Fiber B

| Exposure Temp. °C. | Time Min. | Thermal Shrinkage, percent | Tenacity, gpd | Elongation Percent | Modulus gpd |
|---|---|---|---|---|---|
| —* | — | 1.8 | 8.1 | 22.1 | 97.8 |
| 95 | 1 | 1.5 | 8.0 | 21.7 | 91.2 |
| 95 | 3 | 1.4 | 8.1 | 22.0 | 92.2 |
| 95 | 10 | 1.6 | 7.9 | 20.9 | 93.6 |
| 95 | 20 | 1.3 | 7.9 | 21.6 | 89.8 |
| 120 | 1 | 1.1 | 7.9 | 22.0 | 88.1 |
| 120 | 3 | 1.0 | 8.0 | 22.2 | 88.4 |
| 120 | 10 | 0.9 | 7.9 | 22.6 | 86.3 |
| 120 | 20 | 0.9 | 7.9 | 22.4 | 86.3 |
| 150 | 1 | 0.3 | 7.8 | 23.6 | 84.6 |
| 150 | 3 | 0.0 | 7.9 | 24.9 | 77.8 |
| 150 | 10 | 0.1 | 7.7 | 23.8 | 81.1 |
| 150 | 20 | 0.0 | 7.9 | 25.4 | 76.6 |

*Control

TABLE 4

Effect of Thermal Exposure on Fiber C

| Exposure Temp. °C. | Time Min. | Thermal Shrinkage, percent | Tenacity, gpd | Elongation Percent | Modulus gpd |
|---|---|---|---|---|---|
| —* | — | 0.6 | 7.6 | 20.7 | 99.1 |
| 95 | 1 | 0.3 | 7.1 | 20.5 | 91.5 |
| 95 | 3 | 0.2 | 7.2 | 20.9 | 91.5 |
| 95 | 10 | 0.3 | 7.4 | 21.0 | 90.1 |
| 95 | 20 | 0.1 | 7.5 | 21.1 | 89.4 |
| 120 | 1 | 0.0 | 7.6 | 22.0 | 90.8 |
| 120 | 3 | 0.0 | 7.5 | 21.6 | 92.2 |
| 120 | 10 | 0.0 | 7.5 | 21.9 | 88.0 |
| 120 | 20 | 0.0 | 7.0 | 21.1 | 86.0 |
| 150 | 1 | 0.0 | 7.1 | 21.0 | 88.0 |
| 150 | 3 | 0.0 | 7.2 | 22.2 | 86.0 |
| 150 | 10 | 0.0 | 7.5 | 23.2 | 86.7 |
| 150 | 20 | 0.0 | 7.1 | 22.4 | 88.7 |

*Control

TABLE 5

Treated Polyester (PET) Fiber Properties

| Binder System | % Solids Pickup | Breaking Strength (kg) | Breaking Elongation (%) | Tenacity (gpd) | Modulus (gpd) | Interfacial Shear Strength (kg/cm$^2$) | Wettability |
|---|---|---|---|---|---|---|---|
| 1 (control) | — | 7.66 | 21.4 | 7.7 | 88.5 | 6.67 | 5.0 |
| 2[1] (comparative) | 1.1 | 8.48 | 21.8 | 8.2 | 97.3 | 7.20 | 4.0 |
| 3[2] (comparative) | 0.28 | — | — | — | — | 7.10 | 8.5 |
| 4[3] (comparative) | 0.15 | 7.80 | 20.3 | 7.8 | 98.2 | 7.49 | 3.0 |
| 5[4] | 0.20 | 8.07 | 20.0 | 8.1 | 98.9 | 7.30 | 8.5 |
| 6[5] (comparative) | 0.18 | 8.16 | 21.5 | 8.2 | 94.0 | 7.06 | 6.0 |
| 7[6] (comparative) | 0.44 | 7.98 | 19.0 | 8.0 | 88.5 | 7.57 | 6.5 |
| 8[7] (comparative) | 0.37 | 7.80 | 19.9 | 7.8 | 88.8 | — | 4.0 |
| 9[8] (comparative) | 0.45 | 8.03 | 19.7 | 8.0 | 87.8 | — | 4.0 |

[1]Gamma-glycidoxypropyltrimethoxysilane, water and oil (3.6, 67.5 and 28.9%); oil phase included (isohexadecyl-stearate, glycerol monooleate, decaglycerol tetraoleate POE(15) tall oil fatty acid, sulfonated glycerol trioleate, and POE(20) tallow amine (approximately 62.7, 5.9, 7.9, 7.8, 11.8 and 3.9%).
[2]Vinyl chloride copolymer.
[3]Saturated polyester resin.
[4]Gamma-glycidoxypropyltrimethoxysilane, POE(9–10) octylphenol and water (84.9, 0.1 and 15 percent, respectively).
[5]Isophthalic acid, trimellitic anhydride and diethylene glycol resin in water.
[6]Trimellitic anhydride and propylene glycol resin in water.
[7]Unsaturated polyester resin in water.
[8]Unsaturated polyester resin.

TABLE 6

Wettability

| Binder System* | SEM | Contact Angle (° 's) | Ranking 1 | Ranking 2** | Aesthetic Rating | Wettability Index |
|---|---|---|---|---|---|---|
| 1 | 5 | 54 | — | — | 5 | 5.0 |
| 2 | 5 | 59 | — | — | 3 | 4.0 |
| 3 | 8 | 45 | 4 | 1 | 9 | 8.5 |
| 4 | 3 | 81*** | — | 5 | 3 | 3.0 |
| 5 | 8 | 41 | 1 | 2 | 9 | 8.5 |
| 6 | 6 | 50 | 3 | 4 | 6 | 6.0 |
| 7 | 6 | 66 | 2 | 3 | 7 | 6.5 |
| 8 | 4 | 71 | — | — | 4 | 4.0 |
| 9 | 4 | 69 | 5 | — | 4 | 4.0 |

*See TABLE 1 for details.
**External evaluation of fibers with the five binder systems set forth wherein yarn was removed from a creel, passed through an isophthalic polyester resin (as in filament winding) bath under a roll partially submerged therein, passed through a slot stripper (to remove excess resin) and wound circumferentially on a flat mandrel. Tension was 5 pounds on each fiber. Observations were as follows:

| Binder System | |
|---|---|
| 3 | Fiber tended to fuzz before and after resin bath. The fiber appeared to wet out almost immediately in bath. |
| 4 | No fuzz noted. Wet out almost as fast as 3. |
| 5 | No fuzzing noted when winding. The fiber did not wet initially and after winding the fibers still appeared only partially wet out. |
| 6 | No fuzz noted. Appeared slightly better than Binder 7. After wound, appeared like 3. |
| 7 | No fuzzing noted. Took a couple of minutes to soak in. Wetted better than Binder 5. After wound, appeared like 3. |

***Slightly modified formulation appears to give much better contact angle, i.e., about 40–50°.

TABLE 7

BMC Composite Properties for Fibers

| Binder System[1] | Fiber Ratio PET/Glass | % Solids Pickup | Barcol Hardness | Flexural Strength (PSI × 100) | Tensile Strength (PSI × 100) | Shrinkage (inches) | Impact Strength (ft lbs/in) Notched | Impact Strength (ft lbs/in) Unnotched |
|---|---|---|---|---|---|---|---|---|
| 1 Control | 100/0 | — | 34.8 | 6.22 | 3.31 | 0.0011 | 12.45 | 17.94 |
| 2 Comparative[4] | 100/0 | 1.1 | 42.6 | 5.52 | 3.45 | 0.0016 | 11.64 | 17.21 |
| 3 Comparative | 100/0 | 0.28 | 37.7 | 5.46 | 3.57 | 0.0013 | 12.96 | 18.28 |
| 4 Comparative | 100/0 | 0.15 | 39.5 | 6.35 | 3.30 | 0.0011 | 12.49 | 20.62 |
| 5 Invention | 100/0 | 0.20 | 41.2 | 6.24 | 3.50 | 0.0013 | 12.63 | 19.07 |
| 6 Comparative | 100/0 | 0.18 | 37.0 | 5.52 | 3.54 | 0.0010 | 13.12 | 20.68 |
| 7 Comparative | 100/0 | 0.15 | 37.4 | 5.32 | 3.49 | 0.0090 | 11.97 | 16.17 |
| 8 Comparative | 100/0 | 0.12 | 36.7 | 5.22 | 3.10 | 0.0014 | 10.86 | 19.12 |
| 9 Comparative | 100/0 | 0.15 | 37.2 | 5.15 | 3.45 | 0.0013 | 11.46 | 16.35 |
| 10[2] Comparative | 0/100 | — | 47.1 | 13.17 | 8.63 | 0.0003 | 8.81 | 11.18 |
| 11[3] Comparative | 0/0 | — | 42.2 | 2.60 | 0.95 | 0.0080 | 0.19 | 0.87 |
| 1 Control | 25/75 | — | 49.1 | 15.06 | 5.83 | 0.0099 | 18.28 | 25.21 |
| 2 Comparative[4] | 25/75 | 1.1 | 50.9 | 14.21 | 7.03 | 0.0055 | 16.86 | 25.96 |
| 3 Comparative | 25/75 | 0.28 | 48.6 | 15.01 | 6.62 | 0.0103 | 17.32 | 25.05 |
| 4 Comparative | 25/75 | 0.15 | 49.4 | 14.43 | 5.78 | 0.0098 | 16.52 | 23.28 |
| 5 Invention | 25/75 | 0.20 | 41.7 | 11.56 | 6.26 | 0.0079 | 15.72 | 23.00 |
| 6 Comparative | 25/75 | 0.18 | 49.0 | 13.76 | 6.94 | 0.0102 | 16.87 | 22.21 |
| 7 Comparative | 25/75 | 0.15 | 47.3 | 14.21 | 6.68 | 0.0106 | 17.75 | 25.45 |
| 8 Comparative | 25/75 | 0.12 | 45.8 | 14.53 | 6.10 | 0.0076 | 16.64 | 25.70 |
| 9 Comparative | 25/75 | 0.15 | 45.5 | 11.88 | 6.03 | 0.0078 | 15.78 | 21.28 |
| 10[2] Comparative | 0/100 | — | 49.4 | 16.27 | 6.93 | 0.0003 | 8.81 | 11.18 |
| 11[3] Comparative | 0/0 | — | 42.2 | 2.60 | 0.95 | 0.0080 | 0.19 | 0.87 |
| 1 Control | 50/50 | — | 43.3 | 10.17 | 5.47 | 0.0007 | 9.46 | 13.81 |
| 2 Comparative[4] | 50/50 | 1.1 | 47.0 | 8.84 | 5.41 | 0.0006 | 12.85 | 17.01 |

TABLE 7-continued

BMC Composite Properties for Fibers

| Binder System[1] | Fiber Ratio PET/Glass | % Solids Pickup | Barcol Hardness | Flexural Strength (PSI × 100) | Tensile Strength (PSI × 100) | Shrinkage (inches) | Impact Strength (ft lbs/in) Notched | Impact Strength (ft lbs/in) Unnotched |
|---|---|---|---|---|---|---|---|---|
| 3 Comparative | 50/50 | 0.28 | 45.7 | 10.53 | 4.84 | 0.0005 | 11.44 | 15.63 |
| 4 Comparative | 50/50 | 0.15 | 42.5 | 8.48 | 4.64 | 0.0003 | 10.59 | 12.55 |
| 5 Invention | 50/50 | 0.20 | 41.5 | 9.91 | 5.36 | 0.0006 | 10.26 | 13.71 |
| 6 Comparative | 50/50 | 0.18 | 43.8 | 9.48 | 4.79 | 0.0003 | 12.00 | 14.59 |
| 7 Comparative | 50/50 | 0.15 | 45.1 | 10.84 | 5.27 | 0.0005 | 11.59 | 16.09 |
| 8 Comparative | 50/50 | 0.12 | 41.8 | 8.65 | 5.34 | 0.0010 | 9.77 | 12.32 |
| 9 Comparative | 50/50 | 0.15 | 43.3 | 11.58 | 4.62 | 0.0009 | 9.16 | 15.08 |
| 10[2] Comparative | 0/100 | — | 47.1 | 13.17 | 8.63 | 0.0005 | 10.84 | 15.13 |
| 11[3] Comparative | 0/0 | — | 42.2 | 2.60 | 0.95 | 0.0080 | 0.19 | 0.87 |

TABLE 8

Physical Properties of BMC Composites Varying Resin Elongation

| Resin Elongation, Percent | PET/Glass Ratio | Barcol Hardness | Shrinkage in/in | Notched Impact ft lb/in | Unnotched Impact ft lb/in | Flexural Strength psi | Tensile Strength psi |
|---|---|---|---|---|---|---|---|
| 0.9[1] | 0/100 | 60.7 | 0.0003 | 8.4 | 13.3 | 13 000 | 7210 |
| 0.9[1] | 100/0 | 49.8 | 0.0050 | 14.8 | 24.3 | 4690 | 3140 |
| 1.8[2] | 0/100 | 59.9 | 0.0004 | 7.6 | 10.4 | 11 300 | 6600 |
| 1.8[2] | 12.5/87.5 | 60.0 | 0.0005 | 7.0 | 12.7 | 11 800 | 7050 |
| 1.8[2] | 25/75 | 57.1 | 0.0001 | 7.8 | 12.9 | 9370 | 5710 |
| 1.8[2] | 50/50 | 56.1 | 0.0010 | 12.0 | 12.9 | 8160 | 4640 |
| 1.8[2] | 100/0 | 51.2 | 0.0044 | 14.8 | 23.0 | 4960 | 3310 |
| 6.1[3] | 0/100 | 54.2 | 0.0004 | 8.0 | 10.7 | 14 400 | 8370 |
| 6.1[3] | 12.5/87.5 | 51.5 | 0.0005 | 9.2 | 10.9 | 12 500 | 6570 |
| 6.1[3] | 25/75 | 50.1 | 0.0004 | 9.3 | 16.5 | 9930 | 5670 |
| 6.1[3] | 50/50 | 47.0 | 0.0016 | 11.6 | 17.2 | 8840 | 5410 |
| 6.1[3] | 100/0 | 45.1 | 0.0021 | 16.1 | 26.6 | 5240 | 3480 |
| 10[4] | 0/100 | 46.7 | 0.0003 | 6.6 | 8.0 | 13 400 | 7310 |
| 10[4] | 12.5/87.5 | 47.7 | 0.0007 | 8.0 | 10.4 | 10 800 | 6090 |
| 10[4] | 25/75 | 45.4 | 0.0006 | 8.4 | 10.8 | 10 600 | 6270 |
| 10[4] | 50/50 | 44.1 | 0.0017 | 11.5 | 15.6 | 9900 | 4360 |
| 10[4] | 100/0 | 33.0 | 0.0032 | 19.6 | 26.7 | 3970 | 3100 |

TABLE 9

Physical Properties of PET/Glass Fiber Reinforced Composites

| PET/Glass Ratio | Concentration, Percent | Barcol Hardness | Shrinkage in/in | Notched Impact ft lb/in | Unnotched Impact ft lb/in | Flexural Strength psi | Tensile Strength psi |
|---|---|---|---|---|---|---|---|
| 0/100 | 35 | 46.1 | 0.00020 | 16.3 | 20.5 | 17 700 | 6210 |
| 0/100 | 30 | 47.2 | 0.00039 | 13.6 | 19.3 | 17 200 | 5440 |
| 0/100 | 25 | 57.3 | 0.00056 | 10.0 | 15.4 | 11 100 | 7060 |
| 0/100 | 20 | 49.5 | 0.00057 | 11.9 | 17.5 | 20 800 | 5850 |
| 0/100 | 15 | 52.7 | 0.00108 | 8.2 | 14.6 | 15 300 | 5530 |
| 0/100 | 10 | 51.3 | 0.00123 | 7.6 | 11.5 | 11 900 | 6280 |
| 50/50 | 35 | 34.2 | 0.00149 | 17.3 | 27.7 | 11 000 | 5890 |
| 50/50 | 30 | 41.4 | 0.00151 | 16.5 | 22.9 | 10 900 | 5380 |
| 50/50 | 25 | 46.7 | 0.00087 | 14.9 | 19.3 | 13 000 | 4220 |
| 50/50 | 15 | 51.1 | 0.00155 | 11.2 | 15.5 | 12 600 | 4540 |
| 25/75 | 35 | 37.3 | 0.00045 | 17.0 | 22.8 | 13 800 | 7630 |
| 25/75 | 30 | 41.2 | 0.00059 | 17.2 | 22.9 | 15 800 | 5830 |
| 25/75 | 25 | 48.4 | 0.00067 | 14.6 | 18.8 | 13 100 | 6800 |
| 25/75 | 20 | 50.9 | 0.00064 | 12.8 | 17.0 | 14 300 | 7030 |
| 25/75 | 15 | 53.1 | 0.00121 | 13.5 | 16.0 | 14 200 | 5040 |
| 100/0 | 35 | 22.5 | 0.01072 | 21.2 | 24.8 | 5960 | 3540 |
| 100/0 | 30 | 29.8 | 0.01020 | 16.1 | 25.7 | 4550 | 4050 |
| 100/0 | 25 | 35.9 | 0.00937 | 20.9 | 27.4 | 5790 | 2980 |
| 100/0 | 20 | 40.1 | 0.00929 | 17.1 | 25.4 | 5810 | 3430 |
| 100/0 | 15 | 41.3 | 0.00877 | 13.4 | 19.1 | 4780 | 3340 |
| 100/0 | 10 | 46.8 | 0.00831 | 9.1 | 12.1 | 3640 | 2090 |

TABLE 10

Composite Properties
System = Typical commercial polyester BMC formulation 20 weight percent glass loading, glass replaced by PET on equal volume basis
Fiber length = ¼ inch

|  | 100% Glass | 25% PET/ 75% Glass | 50% PET/ 50% Glass | 100% PET | ASTM |
|---|---|---|---|---|---|
| Physical Properties | | | | | |
| Notched impact ft lb/in | 9.1 | 12.0 | 11.6 | 16.9 | D-256 |
| Tensile strength GTH PSI $\times 10^3$ | 6.9 | 7.0 | 5.4 | 3.5 | D-638 |
| Compressive yield Strength psi $\times 10^3$ | 16.6 | — | 14.2 | 10.0 | D-695 |
| Flexural modulus psi $\times 10^6$ | 1.9 | 1.5 | 1.2 | 1.0 | D-790 |
| Tensile modulus psi $\times 10^5$ | 6.3 | 6.0 | 5.1 | 4.6 | D-630 |
| Abrasion - 1 K cycles (gr) | 3.3 | 2.8 | 2.5 | 2.1 | — |
| Acid Resistance[1] (25% $H_2SO_4$ @ 200° C.) | | | | | |
| Percent tensile strength loss | 28.7 | — | 14.4 | 6.5 | — |
| Electrical properties arc resistance - seconds | 189 | — | 192 | 197 | D-495-73 |
| dielectric constant | | | | | |
| 60 HZ | 5.39 | — | 5.32 | 5.13 | D-150-81 |
| 50 MHZ | 5.11 | — | 4.92 | 4.81 | D-150-81 |
| 1M HZ | 4.90 | — | 4.79 | 4.60 | D-150-81 |

[1]Typical commercial vinyl ester BMC formulation

TABLE 11

Nylon Fiber Reinforced Composites

|  | Fiber Ratio Nylon 6/Glass | | |
|---|---|---|---|
|  | 100/0 | 25/75 | 0/100 |
| Barcol Hardness | 38.4 | 47.3 | 52.5 |
| Impact Notched (ft lbs/in) | 12.99 | 9.30 | 8.37 |
| Impact Unnotched (ft lbs/in) | 17.69 | 9.82 | 12.33 |
| Flex Strength (PSI $\times$ 1000) | 5.38 | 12.28 | 14.60 |
| Tensile Strength (PSI $\times$ 1000) | 2.76 | 5.13 | 5.32 |

What is claimed is:

1. A high tenacity reinforcing polyester fiber for incorporation with a thermosetting resin which is then cured to form a plastic composite, said polyester fiber characterized in that the fiber is treated to enhance wettability with the resin and adhesion with the cured resin, and the fiber has a thermal shrinkage of 3 percent or less, a modulus after cure of at least 70 grams per denier and a tenacity of at least 5.5 grams per denier.

2. The fiber of claim 1 having an elongation of from about 10 to 28 percent and wherein the modulus after cure is 70 to 90 grams per denier and the tenacity is 7 to 9 grams per denier.

3. The fiber of claim 1 which is polyethylene terephthalate.

4. A fiber reinforced plastic composite comprising a cured resin matrix reinforced with fiber, said fiber comprising a high tenacity reinforcing polyester fiber that is treated to enhance adhesion with the cured resin, has a thermal shrinkage of 3 percent or less, a modulus after cure of at least 70 grams per denier and a tenacity of at least 5.5 grams per denier, said polyester fiber being present in an amount sufficient to provide improved notched impact strength to the composite.

5. The composite of claim 4 wherein said cured resin matrix is formed from a thermosetting resin selected from the group consisting of polyester, epoxy, and vinyl ester.

6. The composite of claim 5 wherein the fiber has an elongation of from about 10 to 28 percent, a modulus after cure of 70 to 90 grams per denier and a tenacity of 7 to 9 grams per denier.

7. The composite of claim 6 wherein said polyester fiber is polyethylene terephthalate.

8. The composite of claim 4 wherein the elongation of the fiber in the cured composite is at least 2 times that of the resin matrix.

* * * * *